US010303238B2

(12) United States Patent
Lee et al.

(10) Patent No.: US 10,303,238 B2
(45) Date of Patent: May 28, 2019

(54) DYNAMIC VOLTAGE AND FREQUENCY MANAGEMENT BASED ON ACTIVE PROCESSORS

(71) Applicant: Apple Inc., Cupertino, CA (US)

(72) Inventors: Jong-Suk Lee, Sunnyvale, CA (US); Daniel C. Murray, Morgan Hill, CA (US); Wei-Han Lien, San Jose, CA (US)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 15/609,915

(22) Filed: May 31, 2017

(65) Prior Publication Data

US 2017/0262036 A1  Sep. 14, 2017

Related U.S. Application Data

(63) Continuation of application No. 15/049,236, filed on Feb. 22, 2016, now Pat. No. 9,703,354, which is a
(Continued)

(51) Int. Cl.
*G06F 1/32* (2019.01)
*G06F 1/3206* (2019.01)
(Continued)

(52) U.S. Cl.
CPC .......... *G06F 1/3206* (2013.01); *G06F 1/324* (2013.01); *G06F 1/3287* (2013.01);
(Continued)

(58) Field of Classification Search
CPC ...................................... G06F 1/324
(Continued)

(56) References Cited

U.S. PATENT DOCUMENTS

| 5,719,800 A | 2/1998 | Mittal et al. |
| 6,564,328 B1 | 5/2003 | Grochowski et al. |

(Continued)

FOREIGN PATENT DOCUMENTS

| CN | 101689070 A | 3/2010 |
| CN | 101765822 A | 6/2010 |

(Continued)

OTHER PUBLICATIONS

Office Action, WOEP 14724964.3, Regional Phase EPO of PCT/US2014/034386, dated Aug. 2, 2018, 8 pages.
(Continued)

*Primary Examiner* — Jaweed A Abbaszadeh
*Assistant Examiner* — Volvick Derose
(74) *Attorney, Agent, or Firm* — Meyertons, Hood, Kivlin, Kowert & Goetzel, P.C.; Lawrence J. Merkel

(57) ABSTRACT

In an embodiment, a system may include multiple processors and an automatic power state controller (APSC) configured to switch the processors between various operating points. The operating points may be described by data programmed into the APSC, and the APSC may include a register that is programmable with a target operating point request identifying a target operating point for the processors from among the described operating points. The data describing the operating points may also include an indication of whether or not the number of processors that may be concurrently active at the operating point is limited. Based on the indication and the number of active processors, the APSC may override the requested operating point with a reduced operating point. In some embodiments, a digital power estimator (DPE) may monitor operation of the processors and may throttle the processors when high power consumption is detected.

20 Claims, 8 Drawing Sheets

Related U.S. Application Data continuation of application No. 13/924,164, filed on Jun. 21, 2013, now Pat. No. 9,304,573.

(51) Int. Cl.
| | |
|---|---|
| *G06F 1/324* | (2019.01) |
| *G06F 1/3287* | (2019.01) |
| *G06F 9/50* | (2006.01) |
| *G06F 1/3296* | (2019.01) |
| *G06F 1/3203* | (2019.01) |
| *G06F 1/3228* | (2019.01) |
| *G06F 1/3215* | (2019.01) |

(52) U.S. Cl.
CPC .......... *G06F 1/3296* (2013.01); *G06F 9/5094* (2013.01); *G06F 1/3203* (2013.01); *G06F 1/3215* (2013.01); *G06F 1/3228* (2013.01); *Y02D 10/126* (2018.01); *Y02D 10/171* (2018.01); *Y02D 10/172* (2018.01); *Y02D 10/22* (2018.01)

(58) Field of Classification Search
USPC ........................................................ 713/321
See application file for complete search history.

(56) References Cited

U.S. PATENT DOCUMENTS

| | | | |
|---|---|---|---|
| 7,437,581 | B2 | 10/2008 | Grochowski et al. |
| 7,793,125 | B2 | 9/2010 | Berry, Jr. et al. |
| 7,915,910 | B2 | 3/2011 | Von Kaenel |
| 8,010,822 | B2 | 8/2011 | Marshall et al. |
| 8,190,930 | B2 * | 5/2012 | Herdrich ............... G06F 1/3203 713/300 |
| 8,271,812 | B2 | 9/2012 | de Cesare et al. |
| 8,381,006 | B2 | 2/2013 | Flachs et al. |
| 8,510,740 | B2 * | 8/2013 | Salsbery ............... G06F 1/3203 718/102 |
| 8,756,442 | B2 | 6/2014 | Naffziger et al. |
| 8,788,850 | B1 | 7/2014 | Kaul et al. |
| 9,195,291 | B2 | 11/2015 | Lee |
| 9,304,573 | B2 | 4/2016 | Lee et al. |
| 9,703,354 | B2 | 7/2017 | Lee et al. |
| 9,817,469 | B2 | 11/2017 | Lee |
| 10,101,788 | B2 | 10/2018 | Mylius et al. |
| 2003/0065960 | A1 * | 4/2003 | Rusu ..................... G06F 1/3203 713/300 |
| 2003/0126478 | A1 | 7/2003 | Burns et al. |
| 2003/0126479 | A1 | 7/2003 | Burns et al. |
| 2003/0229814 | A1 * | 12/2003 | Garnett ................. G06F 9/4411 713/322 |
| 2004/0193934 | A1 | 9/2004 | Kahn |
| 2006/0149975 | A1 * | 7/2006 | Rotem .................... G06F 1/206 713/300 |
| 2008/0036613 | A1 * | 2/2008 | Gaskins ................. G06F 1/206 340/584 |
| 2008/0082844 | A1 * | 4/2008 | Ghiasi ................... G06F 1/3203 713/323 |
| 2008/0104425 | A1 | 5/2008 | Gunther et al. |
| 2009/0031155 | A1 * | 1/2009 | Hofmann .............. G06F 1/3203 713/321 |
| 2009/0172424 | A1 | 7/2009 | Cai et al. |
| 2009/0271646 | A1 | 10/2009 | Talwar et al. |
| 2010/0037038 | A1 * | 2/2010 | Bieswanger .......... G06F 1/3203 712/220 |
| 2010/0095137 | A1 * | 4/2010 | Bieswanger .......... G06F 1/3203 713/300 |
| 2010/0115259 | A1 * | 5/2010 | Elsila .................... G06F 1/3203 713/100 |
| 2010/0268968 | A1 * | 10/2010 | Ghiasi ................... G06F 1/3203 713/300 |
| 2010/0312971 | A1 * | 12/2010 | Moallem ............... G06F 1/3203 711/135 |
| 2011/0080202 | A1 * | 4/2011 | Moore .................. G06F 1/3203 327/276 |
| 2011/0093724 | A1 | 4/2011 | Park et al. |
| 2011/0093733 | A1 | 4/2011 | Kruglick |
| 2011/0213950 | A1 * | 9/2011 | Mathieson ............. G06F 1/206 712/30 |
| 2011/0252251 | A1 * | 10/2011 | de Cesare ............. G06F 1/3203 713/320 |
| 2012/0017104 | A1 * | 1/2012 | Siba ...................... G06F 1/3203 713/323 |
| 2012/0036375 | A1 * | 2/2012 | Puschini Pascual ........................ G06F 9/5027 713/300 |
| 2012/0054519 | A1 * | 3/2012 | Branover .............. G06F 1/3203 713/322 |
| 2012/0079290 | A1 * | 3/2012 | Kumar ..................... G06F 1/26 713/300 |
| 2012/0110352 | A1 * | 5/2012 | Branover ................ G06F 1/206 713/300 |
| 2012/0117403 | A1 * | 5/2012 | Bieswanger .......... G06F 1/3206 713/322 |
| 2012/0159198 | A1 * | 6/2012 | Naffziger ............... G06F 1/324 713/300 |
| 2012/0166842 | A1 * | 6/2012 | Sur ......................... G06F 1/206 713/323 |
| 2013/0007413 | A1 | 1/2013 | Thomson et al. |
| 2013/0024713 | A1 * | 1/2013 | Bajic .................... G06F 1/3206 713/340 |
| 2013/0097415 | A1 * | 4/2013 | Li .......................... G06F 9/4893 713/100 |
| 2013/0155081 | A1 * | 6/2013 | Khodorkovsky ..... G06F 1/3206 345/522 |
| 2013/0196709 | A1 * | 8/2013 | Nho ......................... G06F 1/324 455/550.1 |
| 2013/0238912 | A1 * | 9/2013 | Priel ....................... G06F 1/324 713/300 |
| 2013/0246820 | A1 * | 9/2013 | Branover ............. G06F 1/3296 713/320 |
| 2015/0241955 | A1 | 8/2015 | Kosonocky et al. |
| 2016/0179169 | A1 | 6/2016 | Lee et al. |
| 2016/0282930 | A1 * | 9/2016 | Ramachandran ..... G06F 1/3296 |

FOREIGN PATENT DOCUMENTS

| | | |
|---|---|---|
| CN | 102317886 A | 1/2012 |
| CN | 102365606 A | 2/2012 |
| CN | 103207657 A | 7/2013 |
| EP | 2348410 | 7/2011 |
| EP | 2590051 A2 | 5/2013 |
| KR | 1020020062986 A1 | 7/2002 |
| KR | 1020130047577 | 4/2013 |
| TW | I299118 B | 7/2008 |
| WO | 2011147777 | 12/2011 |

OTHER PUBLICATIONS

Office Action, Chinese Patent Office, Chinese Application for Invention No. 201480030491.2, dated Feb. 26, 2018, 11 pages.
U.S. Appl. No. 13/924,180, filed Jun. 21, 2013, Jong-Suk Lee.
U.S. Appl. No. 14/200,216, filed Mar. 7, 2014, John H. Mylius.
International Preliminary Report on Patentability in application No. PCT/US2014/034386, dated Dec. 30, 2015, 7 pages.
Office Action, U.S. Appl. No. 13/924,180, filed Jun. 21, 2013, dated Jun. 2, 2015, pp. 13.
Office Action, Taiwan Application No. 103116144, dated Jun. 26, 2015, 15 pages.
International Search Report and Written Opinion from PCT/US2014/034386, dated Jul. 31, 2014, pp. 1-10.
U.S. Appl. No. 13/924,164, filed Jun. 21, 2013, Jong-Suk Lee.
Notice of Preliminary Rejection(Non-Final), Korean Intellectual Property Office, Korean Patent Application No. 10-2015-7034176, dated Aug. 23, 2016, 7 pages.
Office Action, U.S. Appl. No. 14/200,216, dated Jul. 28, 2016, 12 pages.

(56) References Cited

OTHER PUBLICATIONS

Office Action, JP Application No. 2016-521404, dated Jan. 5, 2017, 2 pages.

* cited by examiner

DYNAMIC VOLTAGE AND FREQUENCY MANAGEMENT BASED ON ACTIVE PROCESSORS

This application is a continuation of U.S. patent application Ser. No. 15/049,236, filed Feb. 22, 2016 and now U.S. Pat. No. 9,703,354, which is a continuation of U.S. patent application Ser. No. 13/924,164, filed on Jun. 21, 2013, now U.S. Pat. No. 9,304,573. The above applications are incorporated herein by reference in their entireties.

BACKGROUND

Technical Field

This application is related to power management in processors.

Description of the Related Art

The number of transistors that can be incorporated on a given semiconductor substrate to form an integrated circuit continues to increase. In parallel, the clock frequencies at which the integrated circuits are operated (the "operating frequencies") also continue to increase. Although the supply voltage magnitude has decreased over time, the power consumption of the integrated circuits has been increasing. In cases in which the integrated circuits are used in devices with limited energy stores (e.g. mobile devices operating on a battery), the power consumption is a factor in how long the device can be used before the device must be recharged. Additionally, the heat generated through power consumption can be an issue in both mobile and non-mobile devices.

Devices that include processors to execute software can manage power consumption in the processors. Typically, a given processor can be stopped if there is no software currently in need of execution on that processor. Stopping a processor can include clock gating, in which the clock is stopped but the processor remains powered up and ready to execute instructions when the clock is restarted, and power gating in which the processor is powered down and will be powered up and reset before executing instructions.

Many devices include multiple processors, including mobile devices. Processors can also be significant power consumers, especially under certain workloads. Accordingly, there can be operating points (combinations of supply voltage magnitude and operating frequency) at which, if all the processors are actively executing, the device is at risk of exceeding the capacity of the power supply in the device. That is, the power supply is capable of sourcing a maximum amount of current. If all the processors are actively executing power-intensive workloads at some of the operating points, the resulting current draw can exceed the amount of current that the power supply can provide. Exceeding the capacity of the power supply may cause erroneous operation (e.g. the supply voltage magnitude may droop to a point at which the integrated circuit no longer operates properly at the operating frequency).

SUMMARY

In an embodiment, a system may include multiple processors and an automatic power state controller (APSC) configured to switch the processors between various operating points. The operating points may be described by data programmed into the APSC, and the APSC may include a register that is programmable with a target operating point request identifying a target operating point for the processors from among the described operating points. The data describing the operating points may also include an indication of whether or not the number of processors that may be concurrently active at the operating point is limited. Based on the indication and the number of active processors, the APSC may override the requested operating point with a reduced operating point. The reduced operating point may be an operating point at which the number of active processors may operate safely (e.g. without exceeding the capacity of the power supply). In some embodiments, a digital power estimator (DPE) may monitor operation of the processors and may throttle the processors when high power consumption is detected. In embodiments including the DPE, the reduced operating point may be somewhat above the operating point at which the processors may operate safely, relying on the DPE throttling to control the most power-consuming scenarios.

BRIEF DESCRIPTION OF THE DRAWINGS

The following detailed description makes reference to the accompanying drawings, which are now briefly described.

Figure 1:
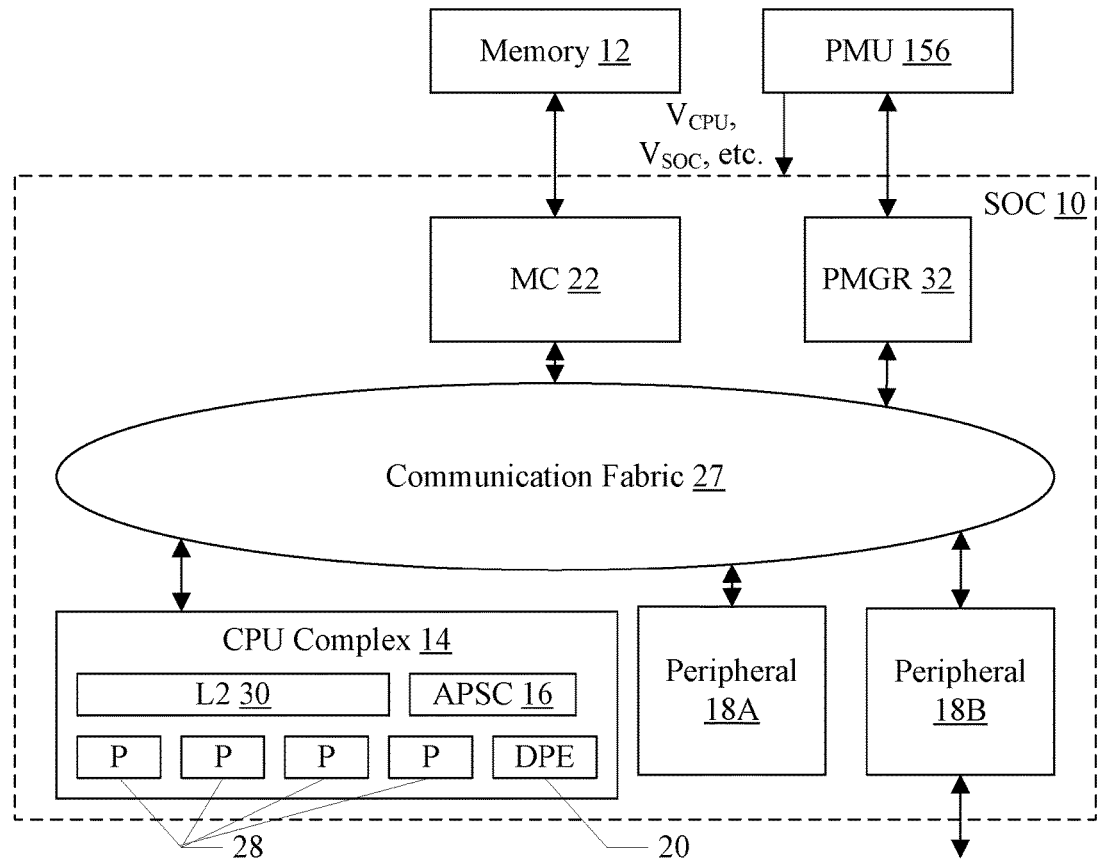
FIG. 1 is a block diagram of one embodiment of a system on a chip including a central processing unit (CPU) complex.

While the embodiments disclosed herein are susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the description is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram of one embodiment of an SOC 10 is shown coupled to a memory 12 and a power management unit (PMU) 156. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a central processing unit (CPU) complex 14, peripheral components 18A-18B (more briefly, "peripherals"), a memory controller 22, a power manager (PMGR) 32, and a communication fabric 27. The components 14, 18A-18B, 22, and 32 may all be coupled to the communication fabric 27. The memory controller 22 may be coupled to the memory 12 during use. In the illustrated embodiment, the CPU complex 14 includes one or more processors 28, a level two (L2) cache 30, an automatic power state controller 16, and a digital power estimator (DPE) circuit 20.

The CPU complex 14 may include one or more CPU processors 28 that serve as the CPU of the SOC 10. The CPU of the system includes the processor(s) that execute the main control software of the system, such as an operating system. Generally, software executed by the CPU during use may control the other components of the system to realize the desired functionality of the system. The processors 28 may also execute other software, such as application programs. The application programs may provide user functionality, and may rely on the operating system for lower level device control. Accordingly, the processors 28 may also be referred to as application processors. The CPU complex 14 may further include other hardware such as the L2 cache 30 and/or and interface to the other components of the system (e.g. an interface to the communication fabric 27).

The APSC 16 may be configured to monitor the active processors 28, and may be configured to dynamically modify an operating point of the CPU complex 14 based on the current operating point and the number of active processors. Particularly, at some of the operating points, if more than a maximum number of processors are active, the total power consumed may exceed the capability of the PMU 156 to provide the power under worst case power consumption in each processor. The APSC 16 may be configured to detect when more than the maximum number of processors is active, and may be configured to reduce the operating point to prevent the power consumed from exceeding the capability of the PMU 156. The reduced operating point may be an operating point at which, even if all of the active processors 28 are consuming worst case power, the total power consumed may not exceed the capability of the PMU 156.

The maximum number of processors 28 may be less than the total number of processors by more than one. For example, the total number of processors 28 may be N and the maximum number of processors for a given operating point may be N-M, where N and M are integers, and N is greater than M. There may be M reduced operating points defined for the given operating point, and one of the M reduced operating points may be selected based on the number of active processors. That is, one of the M reduced operating points may be selected if the number of active processors is one greater than the maximum number; another one of the M reduced operating points may be selected if the number of active processors is two greater than the maximum number; etc. Alternatively, there may be one reduced operating point that is sufficiently reduced for N processors to be active with worst-case power consumption. The maximum number of processors may be operating point-specific. That is, one operating point may have N−M1 as a maximum number, and another operating point may have N−M2 as a maximum number, where M1 and M2 are integers that are not the same. Some operating points may have no maximum number (i.e. all N processors may be active).

The worst case power consumption may occur, e.g., when code containing the highest power-consuming instructions is executed repeatedly in the processors 28. Which instructions are the highest power-consuming instructions may vary from implementation to implementation of the processors 28. In some cases, the highest-power consuming instructions may be a particular type of instruction (e.g. floating point instructions may be higher power-consuming than media or integer instructions, or the media instructions may be the highest power-consuming, etc.). Particular instructions within the type of instruction may be higher than others (e.g. multiply-add floating point instructions may be higher power-consuming than other floating point instruction).

The likelihood that the worst case power-consumption occurs concurrently in each active core may be low. However, since malfunction may occur if the worst case did occur, the APSC 16 may be configured to prevent the possibility. If the possibility were not prevented, then the system including the SOC 10 would be susceptible to a so-called "power virus" attack, in which a nefarious actor attempts to cause malfunction by cause the worst case scenario to occur.

In some embodiments, the DPE circuit 20 may also be included and may operate in conjunction with the APSC 16 to prevent the worst-case power consumption from causing a malfunction, but may allow the reduced operating point to be set at a relatively higher point than if the APSC 16 is used alone. For example, the reduced operating point may be set based on the power consumption of the processors 28 when executing various benchmark programs, which represent common workloads in the system. The highest power-consuming benchmark may be selected, and the reduced operating point may be set such that the highest power-consuming benchmark may be executed in each active processor 28 without exceeding the capability of the PMU 156. The DPE circuit 20 may be configured to monitor the processors 28 to detect cases in which power consumption is exceeding a threshold, and may be configured to throttle one or more of the processors 28 to reduce power consumption. Thus, if a processor 28 is executing code that causes power consumption in excess of the highest power-consuming benchmark, the DPE circuit 20 may prevent the capabilities of the PMU 156 from being exceeded, other than possibly a short period of time (e.g. one or a few clock cycles).

An operating point may refer to a combination of supply voltage magnitude and operating frequency for the CPU complex 14. The operating frequency may be the frequency of the clock that clocks the processors 28. In some cases, other circuitry in the CPU complex 14 may operate at a lower clock frequency derived from the operating frequency (e.g. the L2 cache 30 may operate at a lower clock frequency). The supply voltage magnitude and operating frequency may be related. For example, the supply voltage magnitude may be at least high enough for the processors 28 to operate properly at the operating frequency. In an embodiment, the supply voltage magnitude may be the minimum supply voltage magnitude at which the processors 28 operate properly for the corresponding operating frequency. The operating point may also be referred to as an operating state or power state.

As the supply voltage magnitude and operating frequency increase, the power consumed by the CPU complex 14 may generally increase. Accordingly, at lower operating points (lower supply voltage magnitude and operating frequency), the processors 28 may consume less power and more processors may be permitted to be active at any given time. Generally, a processor may be active if it is powered up. The processor may be available for instruction execution with little delay (e.g. it may be clock gated, but may be ungated if instructions are ready to execute). A processor may be inactive if it is powered off or in another low power state in which a significant delay may be experienced before instructions may be executed. For example, if the processor requires a reset or a relock of a phase lock loop (PLL), it may be inactive even if it remains powered.

The throttling of a processor 28 by the DPE 20 may generally refer to limiting instruction execution by the processor 28 without deactivating the processor or changing its current operating point. Throttling may include limiting an issue rate of instructions (or particular instructions, such as high power-consuming instructions), limiting an execution rate of the instructions, etc.

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 if it is expected to be accessed again soon. In some cases, the memory cache may also be referred to as a system cache, as opposed to private caches such as the L2 cache 30 or caches in the processors 28, which serve only certain components. Additionally, in some embodiments, a system cache need not be located within the memory controller 22.

The peripherals 18A-18B may be any set of additional hardware functionality included in the SOC 10. For example, the peripherals 18A-18B may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include interface controllers for various interfaces external to the SOC 10 (e.g. the peripheral 18B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

The PMGR 32 may be configured to control the supply voltage magnitudes requested from the PMU 156. There may be multiple supply voltages generated by the PMU 156 for the SOC 10. For example, illustrated in FIG. 1 are a $V_{CPU}$ and a $V_{SOC}$. The $V_{CPU}$ may be the supply voltage for the CPU complex 14. The $V_{SOC}$ may generally be the supply voltage for the rest of the SOC 10 outside of the CPU complex 14. There may be multiple supply voltages for the rest of the SOC 10, in some embodiments. In some embodiments, there may also be a memory supply voltage for various memory arrays in the CPU complex 14 and/or the SOC 10. The memory supply voltage may be used with the voltage supplied to the logic circuitry (e.g. $V_{CPU}$ or $V_{SOC}$) and may have a lower voltage magnitude than that required to ensure robust memory operation. In some embodiments, logic local to various components (e.g. the APSC 16) may control the power states of the components, including power up and power down and various other operating points for those components that support more than one operating point. In other embodiments, the PMGR 32 may control power up and power down of other components of the SOC 10, or a combination of local control for some components and PMGR control for other components may be supported. The PMGR 32 may be under direct software control (e.g. software may directly request the power up and/or power down of components) and/or may be configured to monitor the SOC 10 and determine when various components are to be powered up or powered down.

The PMU 156 may generally include the circuitry to generate supply voltages and to provide those supply voltages to other components of the system such as the SOC 10, the memory 12, various off-chip peripheral components (not shown in FIG. 1) such as display devices, image sensors, user interface devices, etc. The PMU 156 may thus include programmable voltage regulators, logic to interface to the SOC 10 and more particularly the PMGR 32 to receive voltage requests, etc.

It is noted that the number of components of the SOC 10 (and the number of subcomponents for those shown in FIG. 1, such as within the CPU complex 14) may vary from embodiment to embodiment. There may be more or fewer of each component/subcomponent than the number shown in FIG. 1.

Figure 2:
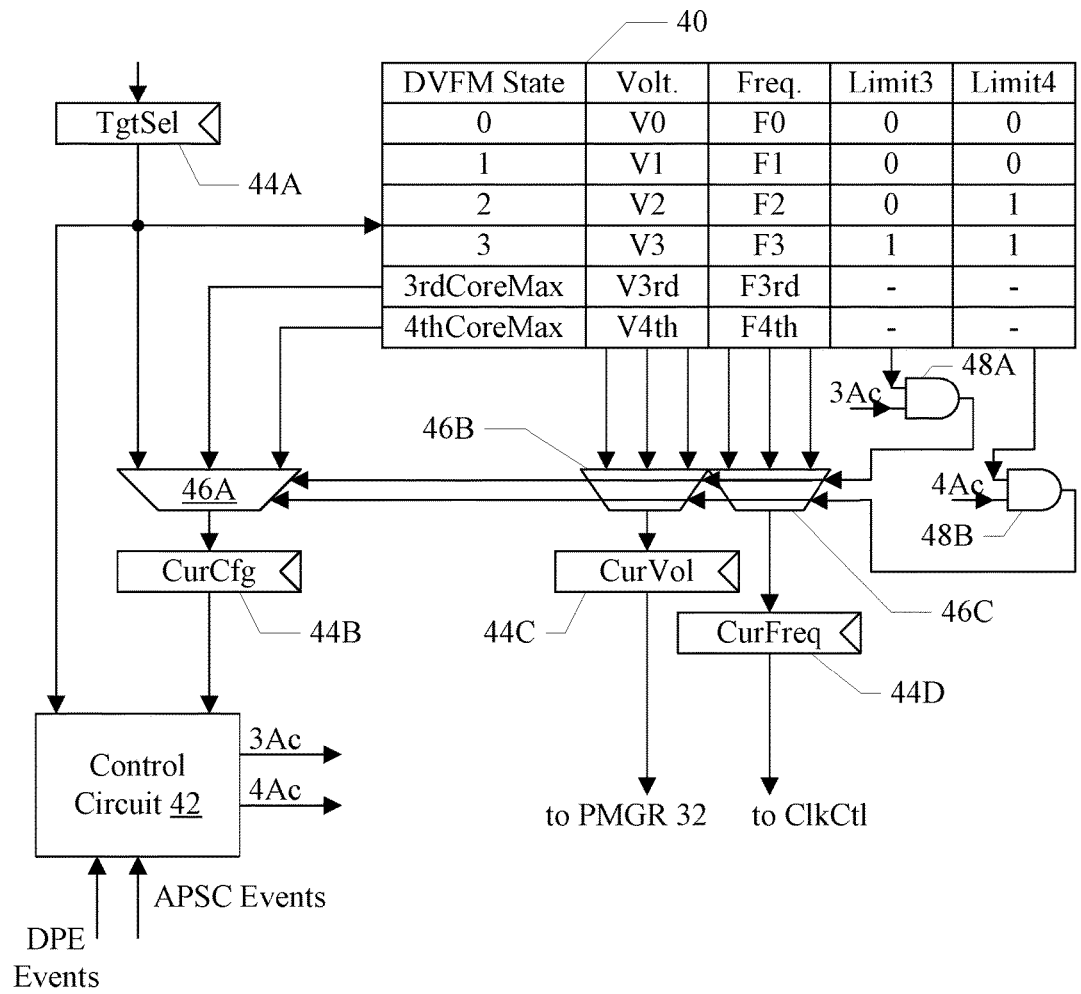
FIG. 2 is a block diagram of one embodiment of an automatic power state controller (APSC) shown in FIG. 1.

FIG. 2 is a block diagram of one embodiment of the APSC 16. In the illustrated embodiment, the APSC 16 includes a dynamic voltage and frequency management (DVFM) table 40, a control circuit 42, registers 44A-44D, multiplexors (muxes) 46A-46C, and logic circuits 48A-48B. The DVFM table 40 is coupled to the register 44A, the muxes 46A-46C, and the logic circuits 48A-48B. The logic circuits 48A-48B are coupled to provide selection controls to the muxes 46A-46C. The muxes 46A-46C are coupled to the registers 44B-44D, respectively. The control circuit is coupled to the registers 44A-44B and to receive DPE events and APSC events. The outputs of the registers 44C and 44D are conveyed to the PMGR 32 and a clock control (ClkCtl) unit (not shown), respectively.

The DVFM table 40 includes multiple entries that may be programmed with data describing various operating points or states (indicated by the DVFM state column in FIG. 2). The register 44A may be programmed with a target operation point selection (TgtSel) from software, identifying the desired operating point for the CPU complex 14. The register 44A may be coupled to a read port on the table 40, and the data from the corresponding entry may be output by the table 40 as the first input to the muxes 46B-46C. The data describing each operating point may be an indication of the supply voltage magnitude (Volt. column in FIG. 2) and the operating frequency (Freq. column in FIG. 2). The data may further include an indication of the maximum number of processors 28 that may be permitted when operating at the operating point. Any indication may be used (e.g. a count of the maximum number, a bit vector as discussed below, a count of the number that may not be active without a change in operating point, etc.).

In the illustrated embodiment and similar embodiments, the indication may be a bit vector with a bit for each number of processors that may be over the maximum number for at least one possible operating point. Thus, for the illustrated embodiment, there are four processors and it is possible that three active processors may be over the maximum (Limit3 bit) and that four active processors may be over the maximum (Limit4 bit). When programming the entries in the table 40, software may populate the bit vector as well based on worst-case power analysis or, in embodiments in which the DPE circuit 20 is used, power analysis based on more normal workloads such as benchmarks. The bits may be indicative, in a first state, that the number of processors is over the limit and, in a second state, that the number of processors is not over the limit. The first state may be the set state and the second state may be the clear state, in the illustrated embodiment. Other embodiments may use the opposite sense of the set and clear states.

Example values for the Limit3 and Limit4 bits are shown in the table 40 for DVFM states 0 through 3. In both DVFM states 0 and 1, any number of processors may be active without presenting power consumption above the PMU 156's capabilities. Accordingly, both the Limit3 and Limit4 bits are clear for these entries in the table 40. In DVFM state 2, the limit may be 3 processors and thus the Limit4 bit is set and the Limit3 bit is clear. In DVFM state 3, the limit may be 2 processors and thus both the Limit3 and the Limit4 bits are set.

The table 40 may output the Limit3 and Limit4 bits indexed by the register 44A to the AND gates 48A-48B, respectively. Additionally, signals indicating whether there are three cores active (3Ac) or 4 cores active (4Ac) may be input to the AND gates 48A-48B, respectively. The 3Ac and 4Ac signals may be generated by the control circuit 42. Accordingly, the AND gate 48A may assert its output signal if the Limit3 bit is set and there are three cores active. The AND gate 48B may assert its output signal if the Limit4 bit is set and there are 4 cores active.

The default selection through the muxes 46A-46C may be the first input (which may be the data output from the table 40 in response to the value in the register 44A for muxes 46B-46C and the output of the register 44A for the mux 46A). If neither mux select from the AND gates 48A-48B is asserted, the default outputs may be selected.

The table 40 includes additional entries beyond the DVFM state entries in this embodiment. These additional entries may store the reduced operating points to be used if the current operating point limits the maximum number of active processors and the maximum number are active (or becoming active). More particularly the 3rdCoreMax entry may store data describing the reduced operating point corresponding to the Limit3 bit (when 2 processors is the maximum number). The 4thCoreMax entry may store the reduced operation point corresponding to the Limit4 bit (when 3 processors is the maximum number). The 4thCoreMax entry may generally store data representing a lower operating point (in terms of potential power consumption per processor) than the 3rdCoreMax entry during use.

The table 40 may be configured to output the data from the 3rdCoreMax and 4thCoreMax entries to the muxes 46B-46C. The data from the 3rdCoreMax entry may be selected in response to the assertion of the select from the AND gate 48A, and the data from the 4thCoreMax entry may be selected in response to the assertion of the select from the AND gate 48B. Corresponding identifiers may be selected through the mux 46A to identify the current operating point, while the target operating point may be retained in the register 44A. In some embodiments, the 3rdCoreMax and 4thCoreMax entries may not be selected by software as a requested operating point (e.g. the entries may not be indexed by any value that may be written to the register 44A). In other embodiments, the entries may also be selected via the register 44A. In such embodiments, the limit bit vector (Limit3 and Limit4 fields) for the 3rdCoreMax and 4thCoreMax entries may be provided and programmed appropriately (or may be hard wired to Limit3 1, Limit4 1 for the 3rdCoreMax entry and Limit3 0, Limit4 1 for the 4thCoreMax entry).

It is noted that, while the AND gates 48A-48B are illustrated separate from the control circuit 42 in FIG. 2, the AND gates 48A-48B may be part of the control circuit 42. Furthermore, any other logic implementation may be used in place of the AND gates 48A-48B, including any Boolean equivalents of the AND gates 48A-48B.

The registers 44B-44D may store data describing the current operating point (or the operating point to which the CPU complex 14 is transition, if the transition is in progress). The register 44B may store an identifier of the current operating point (either the target identifier requested for the CPU complex 14, from the register 44A, or the overriding identifier if the number of active processors exceeds the maximum for the requested operating point). The control circuit 42 may be coupled to receive the output of the registers 44A-44B to determine actions to take for various APSC events and DPE events. The register 44C may store an indication of the currently-requested supply voltage magnitude, which may be conveyed to the PMGR circuit 32 to communicate to the PMU 156. Similarly, an indication of the currently-requested operating frequency may be provided from the register 44D to a clock control circuit to set the operating frequency for the CPU complex 14. The clock control circuit may be part of the PMGR 32, part of the CPU complex 14, or elsewhere within the SOC 10 in various embodiments.

Figure 3:
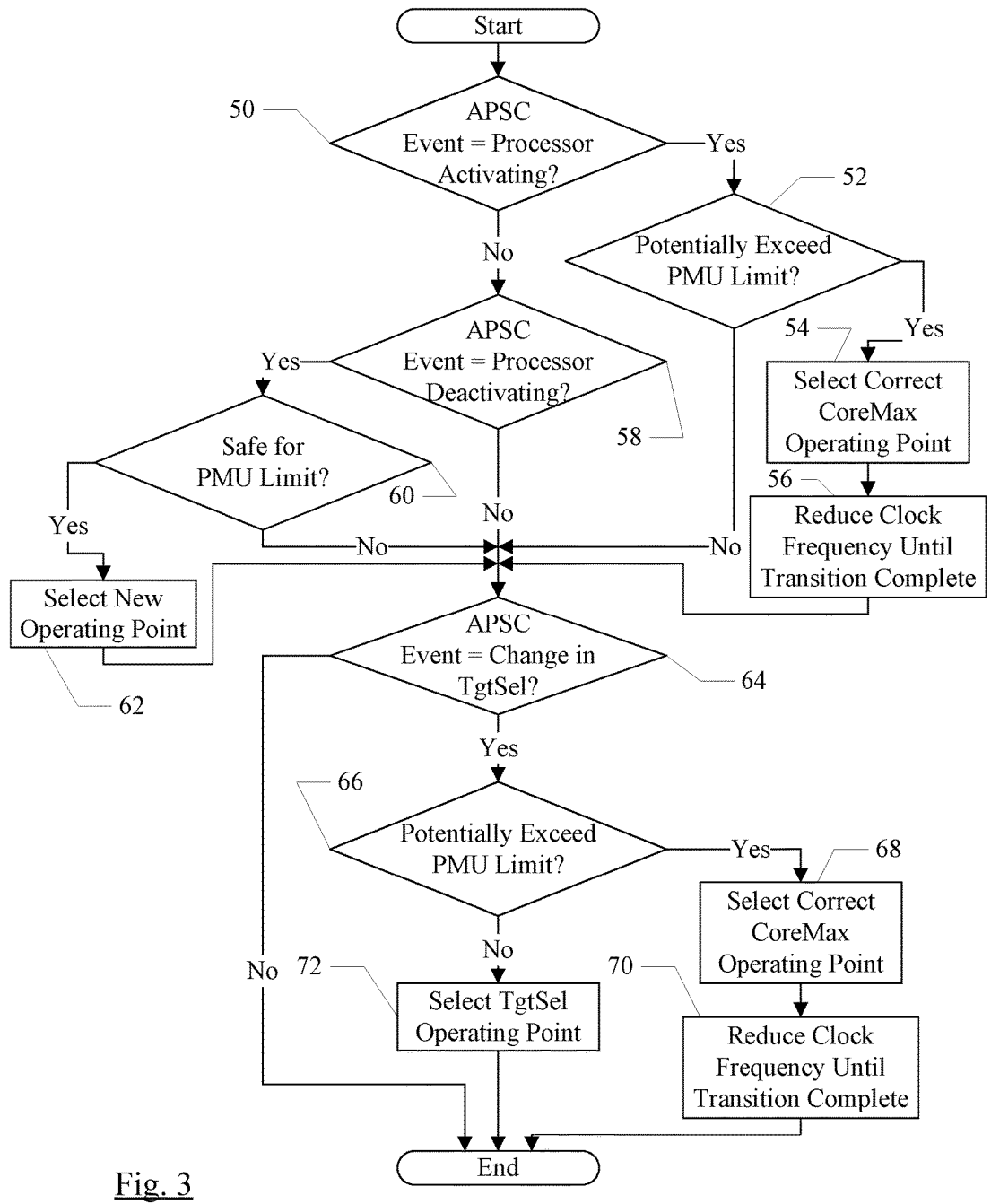
FIG. 3 is a flowchart illustrating operation of one embodiment of the APSC shown in FIG. 2.

Turning now to FIG. 3, a flowchart is shown illustrating operation of one embodiment of the APSC 16 (and more particularly the control circuit 42 including the AND gates 48A-48B). While the blocks are shown in a particular order for ease of understanding, other orders may be used. Blocks may be performed in parallel in combinatorial logic in the APSC 16/control circuit 42. Blocks, combinations of blocks, and/or the flowchart as a whole may be pipelined over multiple clock cycles if desired. The APSC 16 and/or control circuit 42 may be configured to implement the operation illustrated in FIG. 3.

As mentioned previously, the APSC 16/control circuit 42 may receive various APSC events in the CPU complex 14. The APSC events may include processor activation and deactivation events. If a processor activation event occurs (decision block 50, "yes" leg), the APSC 16/control circuit 42 may update its count of active processors. If the updated number of active processors may potentially exceed the PMU limit (decision block 52, "yes" leg), the APSC 16/control circuit 42 may select the correct CoreMax power state (or operating point) through the muxes 46A-46C to reduce the current operating point, to prevent the potential to exceed the PMU limit (block 54). In the present embodiment, the updated number of active processors may exceed the PMU limit if the corresponding limit bit from the bit vector in the currently selected target entry is set. In some embodiments, more than one such transition may occur. For example, if the target operating point is DVFM state 3 in FIG. 2, and two processors are initially active, the target operating point may be established. Subsequently, activation of a third processor may cause the reduction of the operating point to the 3rdCoreMax state. While in the 3rdCoreMax state (or even while transitioning to the 3rdCoreMax state), the fourth processor may activate and cause a transition to the 4thCoreMax state.

Transitioning to the reduced state may take time. For example, about 4.5 microseconds may be used to reduce the operating frequency and then about 5 microseconds may be used to reduce the supply voltage magnitude. During the transition time, the newly activating processor may begin executing, which could result in the PMU limit being exceeded until the reduced operating point is established. To prevent this, the APSC 16/control circuit 42 may reduce the operating frequency using a clock divider (e.g. divide the clock frequency by two, or some other integer). Such an operating frequency change may be achieved more rapidly than the change between frequencies as specified in different operating points, which may require relocking a phase locked loop (PLL) to the new clock frequency, for example. That is, changing the divider to a different integer that is a power of two of the current integer may not change the phase of the clock signal, and thus the PLL lock may not be lost and need not be re-acquired. The reduced frequency may remain in effect until the transition to the reduced operating point is complete (block 56).

If the APSC event is the deactivation of a processor (decision block 58, "no" leg), the control circuit 42 may update the number of active processors. If the current operating point is one of the reduced operating points, it may be safe to return to the target operating point or one of the higher operating points (e.g. the 3rdCoreMax state, if the current operating point is the 4thCoreMax state) based on the updated number of active processors. If the updated number indicates that a higher operating point may be used (decision block 60, "yes" leg), the APSC 16/control circuit 42 may select the new operating point through the muxes 46A-46C (block 62).

Another type of APSC event that may affect the current operating point is a change in the selected operating point, as represented by the TgtSel value in the register 44A. The control circuit 42 may monitor the register 44A to detect the change, or software may update another register to indicate the change in operating point, which may be an APSC event. If the TgtSel is changed to indicate a different operation point (decision block 64), the different operating point may potentially lead to the PMU limit being exceeded for the currently active processors. Accordingly, if the TgtSel is changed (decision block 64, "yes" leg) and the newly selected operation point in conjunction with the number of currently active processors indicates that the PMU limit could potentially be exceeded (decision block 66, "yes" leg), the APSC 16/control circuit 42 may select the correct CoreMax state through the muxes 46A-46C and may reduce the operating frequency until the transition is complete, similar to the above discussion (blocks 68 and 70). If the newly selected operating point may not lead to the PMU limit being exceeded with the number of currently active processors (decision block 66, "no" left), the APSC 16/control circuit 42 may select the TgtSel operating point and may transition to the selected operating point (block 72).

Figure 4:
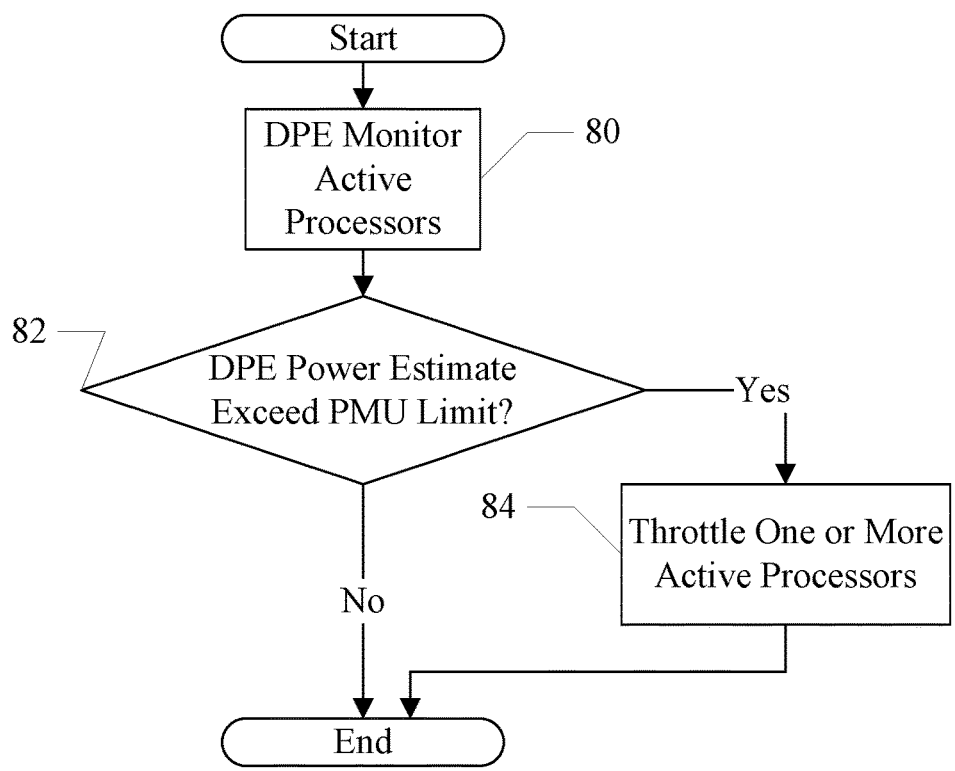
FIG. 4 is a flowchart illustrating operation of one embodiment of a digital power estimator (DPE) shown in FIG. 1 in conjunction with the APSC.

As mentioned previously, some embodiments may also employ the DPE circuit 20, and such embodiments may permit the 3rdCoreMax and 4thCoreMax entries to be programmed to a higher operating point (higher supply voltage magnitude and operating frequency) than would be permitted if the DPE circuit 20 was not included. FIG. 4 is a flowchart illustrating operation of one embodiment of the DPE circuit 20 for use in conjunction with the APSC 16. While the blocks are shown in a particular order for ease of understanding, other orders may be used. Blocks may be performed in parallel in combinatorial logic in the DPE circuit 20. Blocks, combinations of blocks, and/or the flowchart as a whole may be pipelined over multiple clock cycles if desired. The DPE 20 may be configured to implement the operation illustrated in FIG. 4.

The DPE circuit 20 may monitor the active processors in the CPU complex 14, and may be configured to form digital estimates of the power consumption (block 80). The digital estimates may be generated in any fashion. For example, the DPE circuit 20 may be configured to monitor various blocks with each processor (e.g. pipeline stages, execution units, other microarchitectural blocks, etc.). The DPE circuit may be configured to detect activity levels, events, or any other measure of activity from each block, and may estimate the power consumed by the monitored activities. The DPE circuit 20 may be programmable with a numeric factor for each monitored activity, for example, and may sum the factors for each activity to form an estimate. The estimate may be scaled to the current operating frequency and supply voltage magnitude, in some embodiments. The DPE circuit 20 may be configured to determine if the power estimates for the active processors indicate that the PMU limit may be exceeded (decision block 82). If so (decision block 82, "yes" leg), the DPE circuit 20 may be configured to throttle one or more active processors (block 84).

It is noted that, in some embodiments, the DPE circuit 20 may also be configured to determine if the processors have been throttled more than a threshold number of times. Detecting such operation may indicate that the CPU complex 14 is experiencing worst-case power consumption and thus may indicate that a further reduced operating point may be desirable to reduce the throttling. In an embodiment, the DPE circuit 20 may generate a DPE event to the control circuit 42 to request such a change. In such embodiments, the DPE circuit 20 may also detect that the DPE circuit 20 has not throttled the processors for more than a threshold number of times, and may generate a DPE event to return the operating point to the previous level if the operating point was previously further reduced. Some such embodiments are discussed in more detail below.

Figure 5:
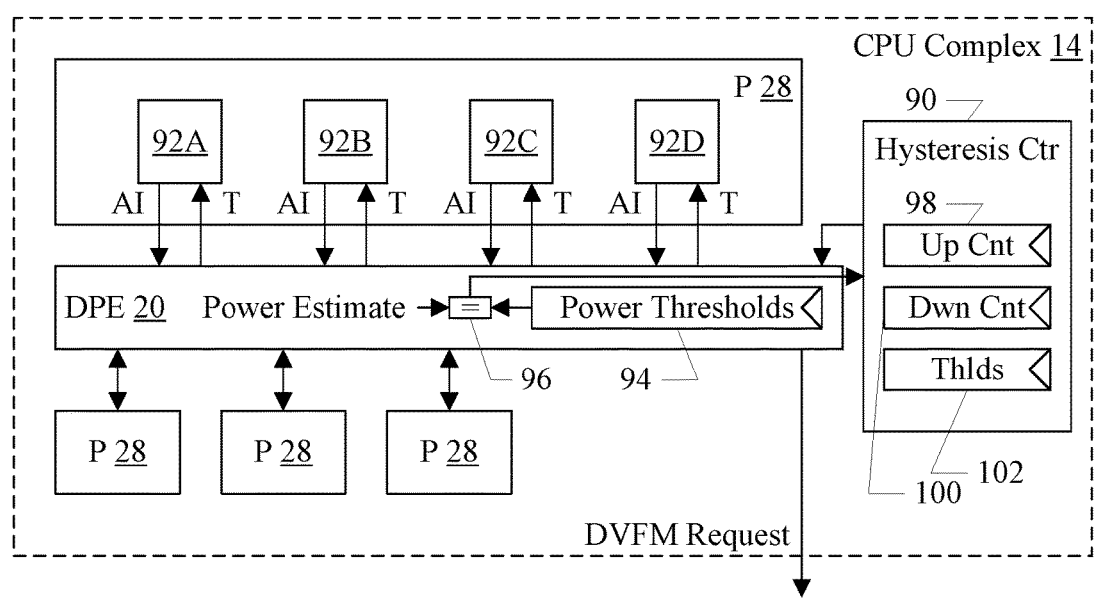
FIG. 5 is a block diagram of an embodiment of the DPE in the CPU complex.

Turning now to FIG. 5, a block diagram of one embodiment of a portion of the CPU complex 14 is shown. In the illustrated embodiment, the CPU complex 14 includes the DPE circuit 20, the processors 28, and a hysteresis counter 90. The DPE circuit 20 is coupled to the processors 28 and the hysteresis counter 90, and to provide a DVFM request. One of the processors 28 is shown to include blocks 92A-92D. Other processors 28 may be similar. The DPE circuit 20 may include one or more power thresholds registers 94 and comparator(s) 96. The hysteresis counter 90 may include an up counter 98, a down counter 100, and one or more count thresholds in a register 102.

The blocks 92A-92D may implement various subfunctions of the processor 28. For example, the blocks 92A-92D may be various pipeline stages of the processor 28. The blocks 92A-92D may be execution units within the processor 28. The blocks 92A-92D may be other microarchitectural elements (e.g. caches, decode units, branch prediction hardware, rename hardware, reorder buffers, schedulers, reservation stations, etc.) in addition to execution units. Any block divisions may be made, as desired. Each block 92A-92D may provide one or more activity indicators (AI) to the DPE circuit 20. In some embodiments, not all of the blocks 92A-92D may provide activity indicators. The number of blocks in a processor 28 may vary from embodiment to embodiment.

Based on the activity indicators, the DPE circuit 20 may be configured to generate a power estimate for the processors 28. The DPE circuit may be configured to compare the power estimate to the power threshold from the register 94. If the power estimate exceeds the power threshold, the DPE circuit 20 may be configured to throttle one or more of the processors 28. For example, the DPE circuit 20 may throttle a processor or processors 28 that is/are consuming the most power. Alternatively, the DPE circuit 20 may throttle the processors 28 equally. The throttle indications to the blocks 92A-92D may throttle the various blocks. In some embodiments, not all blocks 92A-92D may receive the throttle indications. In addition, the DPE circuit 20 may be configured to signal the hysteresis counter 90 that the power estimate exceeds the power threshold. If the power estimate does not exceed the power threshold, the DPE circuit 20 may not throttle the processors 28 and may signal the hysteresis counter 90 that the power estimate does not exceed the power threshold. Alternatively, the power threshold register 94 may store a second power threshold, and the comparator 96 may compare the second power threshold to the power estimate and signal the hysteresis counter 90 that the power estimate does not exceed the second power threshold. The second power threshold may be programmed lower than the other power threshold mentioned earlier in this paragraph.

The power thresholds may be programmed based on the capability of the PMU 156, and may include guard banding to ensure that the PMU capability is not exceeded. The power thresholds may be programmed differently in embodiments in which the DPE circuit 20 is used in conjunction with the APSC 16 then if the DPE circuit 20 is used alone (e.g. the thresholds may be higher when used in conjunction with the APSC 16).

The hysteresis counter may be configured to increment the up counter 98 in response to a signal that the power threshold has been exceeded, and may be configured to increment the down counter in response to a signal that the power threshold has not been exceeded. The counts may be compared to a count threshold from the thresholds registers 102, and the hysteresis counter 90 may be configured to signal the DPE circuit 20 if the threshold is exceeded. If the threshold is exceeded by the up counter, the DPE circuit 20 may be configured to generate a DVFM request to reduce the operating point. If the threshold is exceeded by the down counter, the DPE circuit 20 may be configured to generate a DVFM request to restore the operating point if it has previously been reduced. In some embodiments, there may be separate count thresholds in the register 102 for the up counter 98 and the down counter 100. In other embodiments, the same threshold may be used.

In one embodiment, the hysteresis counter 90 may be configured to clear the down counter when incrementing the up counter and vice versa. Accordingly, the up counter 98 may be a count of a number of consecutive power estimates that exceed the power threshold without an intervening estimate that does not exceed the power threshold (or the second power threshold). Similarly, the down counter 100 may be a count of the number of consecutive power estimates that do not exceed the power threshold (or the second power threshold) without an intervening power estimate that exceeds the power threshold. In this manner, there may be hysteresis in the power estimates before causing DVFM transitions. The power estimates may be taken each clock cycle of the clock that clocks the processors 28. Alternatively, the power estimates may be taken at a slower interval, based on activity throughout the interval.

Figure 6:
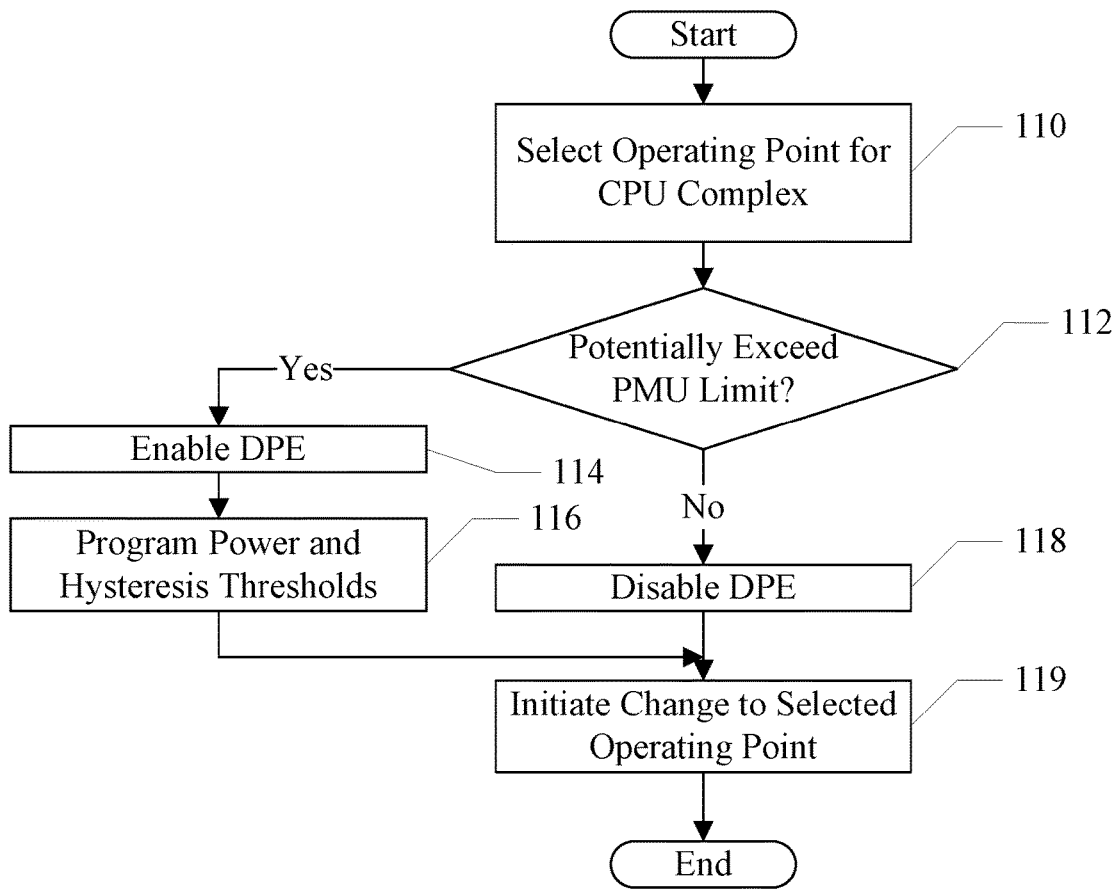
FIG. 6 is a flowchart illustrating one embodiment of selectively enabling the DPE.

Turning now to FIG. 6, a flowchart is shown illustrating operation of one embodiment of DVFM hardware and/or software to interact with the DPE circuit 20. While the blocks are shown in a particular order for ease of understanding, other orders may be used. Blocks may be performed in parallel in combinatorial logic in DVFM hardware, for those features implemented in hardware (e.g. the APSC 16 and/or the PMGR 32, in various embodiments). Blocks, combinations of blocks, and/or the flowchart as a whole may be pipelined over multiple clock cycles if desired. The DVFM hardware may be configured to implement the operation illustrated in FIG. 6. For those features implemented in software, the software code may include instructions executable (e.g. by one of the processors 28) to implement the operation for the described features.

The DVFM hardware/software may select the operating point for the CPU complex 14 (block 110). A variety of factors may affect the selection of the operating point. For example, the schedule of tasks to be performed may affect the selection. A higher operating point may be desired if there is more work to be performed (because higher operating points should lead to higher performance). On the other hand, if there are fewer tasks to be performed, a lower operating point may be selected to conserve power. The available energy for the system (e.g. plugged into a wall outlet versus battery power and an available amount remaining battery power) may be a factor affecting the desired operating point. In some cases, thermal issues may lead to a reduced operating point.

The DVFM hardware/software may determine if the CPU complex 14 could potentially exceed the PMU limit at the selected operating point if enough processors are active (decision block 112). If so (decision block 112, "yes" leg), the DVFM hardware/software may enable the DPE circuit 20 to monitor the active processors (block 114). The DVFM hardware/software may also program the power thresholds in the DPE circuit 20 and the count thresholds in the hysteresis counter 90, in some embodiments (block 116). The power thresholds and/or count thresholds may vary based on the selected operating point and may be programmed each time the DPE circuit 20 is enabled, in some embodiments. In other embodiments, the thresholds may be the same for each operating point and they may be programmed once, e.g. during initialization of the SOC 10. If the CPU complex 14 could not exceed the PMU limit at the selected operating point (decision block 112, "no" leg), the DVFM hardware/software may disable the DPE circuit 20 since monitoring is not needed (block 118) In either case, the DVFM hardware/software may initiate the change to the selected operating point (block 119).

Figure 7:
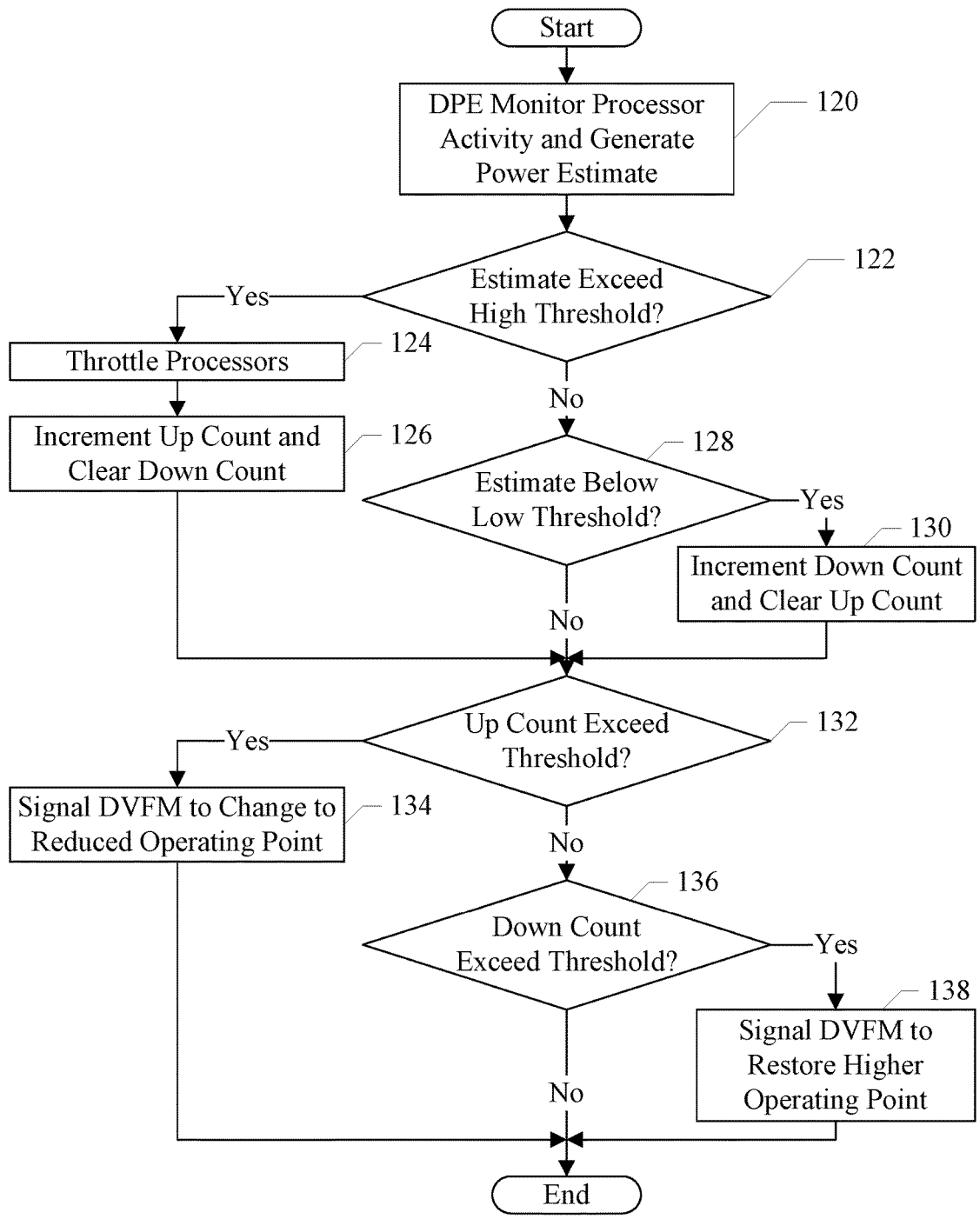
FIG. 7 is a flowchart illustrating operation of one embodiment of the components in FIG. 5 when the DPE is enabled.

Turning now to FIG. 7, a flowchart is shown illustrating operation of one embodiment of DPE circuit 20 and the hysteresis counter 90. While the blocks are shown in a particular order for ease of understanding, other orders may be used. Blocks may be performed in parallel in combinatorial logic in DPE circuit 20 and/or hysteresis counter 90. Blocks, combinations of blocks, and/or the flowchart as a whole may be pipelined over multiple clock cycles if desired. The DPE circuit 20 and/or the hysteresis counter 90 may be configured to implement the operation illustrated in FIG. 7.

The DPE circuit 20 (when enabled) may be configured to monitor the processor activity in the processors 28 and generate a power estimate (block 120). The DPE circuit 20 may be configured to compare the estimate to the high power threshold (decision block 122) and the low power threshold (decision block 128). The high power threshold may be the power threshold against which the DPE circuit 20 compares the power estimate to determine if the power threshold is exceeded, when two thresholds are implemented. The low threshold may be the power threshold against which the DPE circuit 20 compares the power estimate to determine if a return to a higher operating point may be permitted, when two thresholds are implemented. In some embodiments, only one threshold may be implemented and a comparison against the single threshold (greater than/less than) may be made.

If the power estimate exceeds the high power threshold (decision block 122, "yes" leg), DPE circuit 20 may be configured to throttle the processors 28 (block 124). Additionally, the DPE circuit 20 may be configured to signal the hysteresis counter 90, which may be configured to increment the up counter 98 and clear the down counter 100 (block 126). On the other hand, if the power estimate is less than the low threshold (decision block 128, "yes" leg), the DPE circuit 20 may be configured to signal the hysteresis counter 90, which may be configured to increment the down counter 100 and clear the up counter 98 (block 130).

The hysteresis counter 90 may be configured to compare the up and down counts in the up counter 98 and the down counter 100 to the count threshold in the threshold register 102 (or to separate thresholds for the up and down counters, if implemented). If the up count exceeds the count threshold (decision block 132, "yes" leg), the hysteresis counter 90 may signal the DPE circuit 20, which may signal the DVFM hardware to change to a lower operating point (block 134). If the down count 136 exceeds the count threshold (decision block 136, "yes" leg), the hysteresis counter 90 may signal the DPE circuit 20, which may signal the DVFM hardware to restore a higher operating point if the operating point had previously been reduced based on the up count (block 138). The DVFM hardware may be the APSC 16, in embodiments in which the APSC 16 is included. In other embodiments, the APSC 16 may not be included and the DVFM hardware may be in the PMGR 32.

Figure 8:
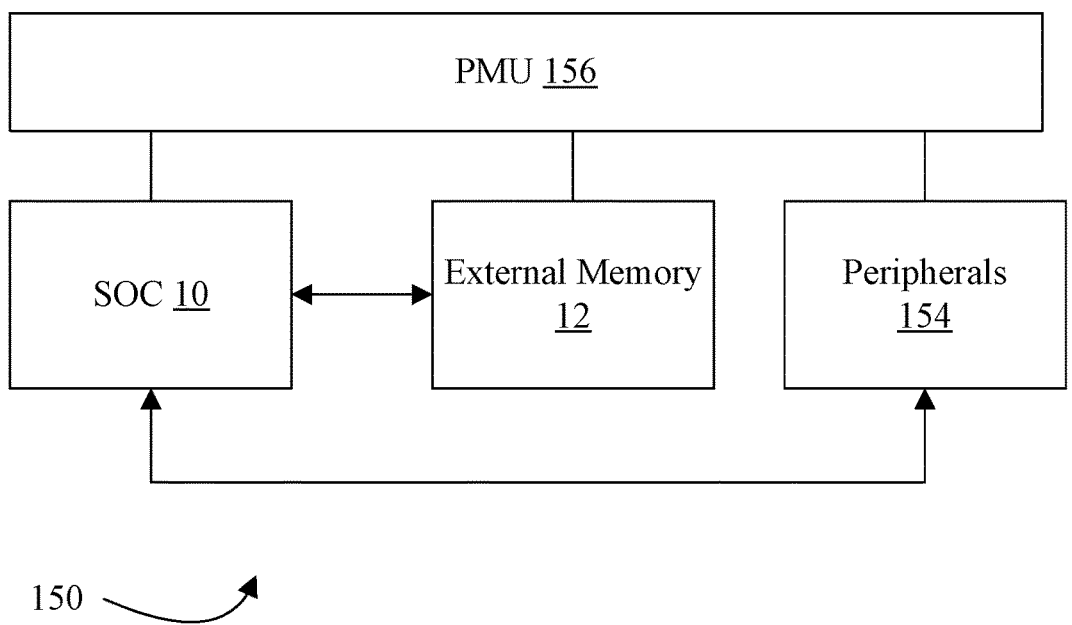
FIG. 8 is a block diagram of one embodiment of a system.

Turning next to FIG. 8, a block diagram of one embodiment of a system 150 is shown. In the illustrated embodiment, the system 150 includes at least one instance of the SOC 10 coupled to one or more peripherals 154 and the external memory 12. The PMU 156 is provided which supplies the supply voltages to the SOC 10 as well as one or more supply voltages to the memory 12 and/or the peripherals 154. In some embodiments, more than one instance of the SOC 10 may be included (and more than one memory 12 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 12 may include any type of memory. For example, the external memory 12 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 12 may include one or more memory modules to which the memory devices are mounted, such as single inline memory modules (SIMMs), dual inline memory modules (DIMMs), etc. Alternatively, the external memory 12 may include one or more memory devices that are mounted on the SOC 10 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:
1. An apparatus comprising:
a plurality of processors; and
a power control circuit coupled to the plurality of processors, wherein:

the power control circuit includes a register that is software-writeable to select a selected operating point of a plurality of operating points for the plurality of processors, the power control circuit further includes a memory including at least one table that is programmed with data describing the plurality of operating points and at least one additional operating point that is not selectable via any value that is programmable in the register, the data further includes an indication for each respective operating point of the plurality of operating points indicating a maximum number of active processors in the plurality of processors that are permitted at the respective operating point, and the power control circuit is configured to determine a current operating point for the plurality of processors responsive to a first number of active processors, the maximum number for the selected operating point, and the at least one additional operating point, wherein the at least one additional operating point overrides the selected operating point responsive to the first number exceeding the maximum number.

2. The apparatus as recited in claim 1 wherein the power control circuit is configured to:

detect that a second number of processors to be active exceeds the maximum number for the selected operating point; and determine the current operating point from the at least one additional operating point responsive to detecting that the second number exceeds the maximum number.

3. The apparatus as recited in claim 2 wherein the at least one additional operating point comprises a lower-power operating point than the selected operating point, wherein a capability of a power management unit that supplies the plurality of processors is not exceeded for the second number of active processors at the lower-power operating point but is potentially exceeded at the selected operating point.

4. The apparatus as recited in claim 3 wherein the power control circuit is configured to detect that the second number exceeds the maximum number responsive to a first processor of the plurality of processors attempting to activate, and wherein the selected operating point is the current operating point at a time that the first processor attempts to activate.

5. The apparatus as recited in claim 4 wherein the power control circuit is configured to reduce a clock frequency specified by the selected operating point until a transition to the lower-power operating point completes.

6. The apparatus as recited in claim 2 wherein the power control circuit is configured to detect that the second number exceeds the maximum number responsive to an update to the register, wherein the selected operating point is specified by the register subsequent to the update.

7. The apparatus as recited in claim 1 wherein the power control circuit is configured to detect that the first number is less than the maximum number responsive to one of the plurality of processors deactivating while the current operating point is a second operating point specified by the at least one additional operating point, and wherein the power control circuit is configured to change the current operating point to the selected operating point responsive to detecting the deactivation.

8. The apparatus as recited in claim 1 wherein at least one additional operating point comprises a plurality of additional operating points, wherein each of the plurality of additional operating points corresponds to a different number of processors that would exceed the maximum number for at least one of the plurality of operating points.

9. A method comprising:

reading a selected operating point of a plurality of operating points for a plurality of processors responsive to a register value in a software-programmable register, the plurality of operating points stored in a table in a power control circuit coupled to the plurality of processors, wherein the table further includes at least one additional operating point that is not selectable via any value programmable in the register, wherein the selected operating point includes an indication of a maximum number of active processors in the plurality of processors that are permitted at the respective operating point; and determining a current operating point for the plurality of processors responsive to a first number of active processors, the maximum number for the selected operating point, and the at least one additional operating point, wherein the determining includes overriding the selected operating point with the at least one additional operating point responsive to the first number exceeding the maximum number.

10. The method as recited in claim 9 further comprising:

detecting that a second number of processors to be active exceeds the maximum number for the selected operating point; and determining the current operating point from the at least one additional operating point responsive to detecting that the second number exceeds the maximum number.

11. The method as recited in claim 10 wherein the at least one additional operating point comprises a lower-power operating point than the selected operating point, wherein a capability of a power management unit that supplies the plurality of processors is not exceeded for the second number of active processors at the lower-power operating point but is potentially exceeded at the selected operating point.

12. The method as recited in claim 11 wherein detecting that the second number exceeds the maximum number is responsive to a first processor of the plurality of processors attempting to activate, and wherein the selected operating point is the current operating point at a time that the first processor attempts to activate.

13. The method as recited in claim 12 further comprising reducing a clock frequency specified by the selected operating point until a transition to the lower-power operating point completes.

14. The method as recited in claim 10 wherein detecting that the second number exceeds the maximum number is responsive to an update to the register, wherein the selected operating point is specified by the register subsequent to the update.

15. The method as recited in claim 14 further comprising programming the register to modify the selected operating point.

16. The method as recited in claim 9 further comprising:

detecting that the first number is less than the maximum number responsive to one of the plurality of processors deactivating while the current operating point is a second operating point specified by the at least one additional operating point; and changing the current operating point to the selected operating point responsive to detecting the deactivation.

17. The method as recited in claim 9 wherein the at least one additional operating point comprises a plurality of additional operating points, wherein each of the plurality of additional operating points corresponds to a different number of processors that would exceed the maximum number for at least one of the plurality of operating points.

18. An apparatus comprising:
a plurality of processors; and
a power control circuit coupled to the plurality of processors, wherein:
the power control circuit includes a first register that is software-writeable to select a selected operating point of a plurality of operating points for the plurality of processors,
the power control circuit further includes a memory including at least one table that is programmed with data describing the plurality of operating points and a plurality of additional operating points that are not selectable via any value programmable in the first register,
the data further includes an indication for each respective operating point of the plurality of operating points indicating a maximum number of active processors in the plurality of processors that are permitted at the respective operating point,
each additional operating point of the plurality of additional operating points corresponds to a different number of active processors that exceeds that maximum number for at least one of the plurality of operating points, and
the power control circuit is configured to determine a current operating point for the plurality of processors responsive to a first number of active processors, the maximum number for the selected operating point, and the plurality of additional operating points, wherein one of the plurality of additional operating points overrides the selected operating point responsive to the first number exceeding the maximum number.

19. The apparatus as recited in claim 18 wherein the power control circuit further comprises a second register that stores the current operating point, and wherein the first register retains the selected operating point when the current operating point is not the selected operating point.

20. The apparatus as recited in claim 19 wherein the table is configured to output the current operating point specified by the second register.

* * * * *